United States Patent [19]

Burger et al.

[11] Patent Number: 4,777,709
[45] Date of Patent: Oct. 18, 1988

[54] APPARATUS FOR THE INSERTION OF SEALING PROFILES

[75] Inventors: Rudolf Burger; Gunter Hartmann; Dietrich Höh; Wolfgang Kolke; Josef Pössinger, all of Munich, Fed. Rep. of Germany

[73] Assignee: Siemens Aktiengesellschaft, Berlin and Munich, Fed. Rep. of Germany

[21] Appl. No.: 904,639

[22] Filed: Sep. 8, 1986

[30] Foreign Application Priority Data

Sep. 30, 1985 [DE] Fed. Rep. of Germany ....... 3534854

[51] Int. Cl.⁴ ............................................. B23P 19/02
[52] U.S. Cl. ................................................... 29/235
[58] Field of Search ................... 29/235; 254/134.3 R, 254/134.3 FT

[56] References Cited

U.S. PATENT DOCUMENTS

| | | | |
|---|---|---|---|
| 1,761,592 | 6/1930 | Seidel | 254/134.3 FT |
| 2,421,856 | 6/1947 | Teegarden | 29/235 |
| 2,924,007 | 2/1960 | Wrightfield | |
| 3,702,138 | 11/1972 | Abrahamsson et al. | 29/235 |
| 4,207,130 | 6/1980 | Barber | 29/235 |
| 4,331,322 | 5/1982 | Woodruff | 254/134.3 FT |
| 4,342,535 | 8/1982 | Bartlett et al. | |
| 4,477,969 | 10/1984 | Cabaud | 29/235 |

FOREIGN PATENT DOCUMENTS 2707332 8/1978 Fed. Rep. of Germany .
2286029 4/1976 France .

Primary Examiner—Frederick R. Schmidt
Assistant Examiner—Judy J. Hartman
Attorney, Agent, or Firm—Hill, Van Santen, Steadman & Simpson

[57] ABSTRACT

The insertion of sealing profiles with a programmable manipulation device, particularly with an industrial robot, is served by an apparatus wherein the sealing profile is conductable via a longitudinal guide matched to the profile shape, being conductable immediately under a pressure roller arranged at a distance therefrom, whereby the pressure roller is driven such that no, or only slight tensile stresses arise in the sealing profile upon insertion. With the help of such an apparatus, for example, door seals can be laid in the receptacle bead of dishwasher receptacles whereby curves of the receptacle bead raise no problems as a result of the compensation of the tensile stresses.

14 Claims, 3 Drawing Sheets

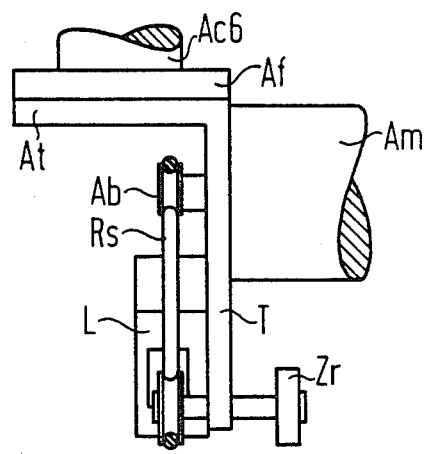
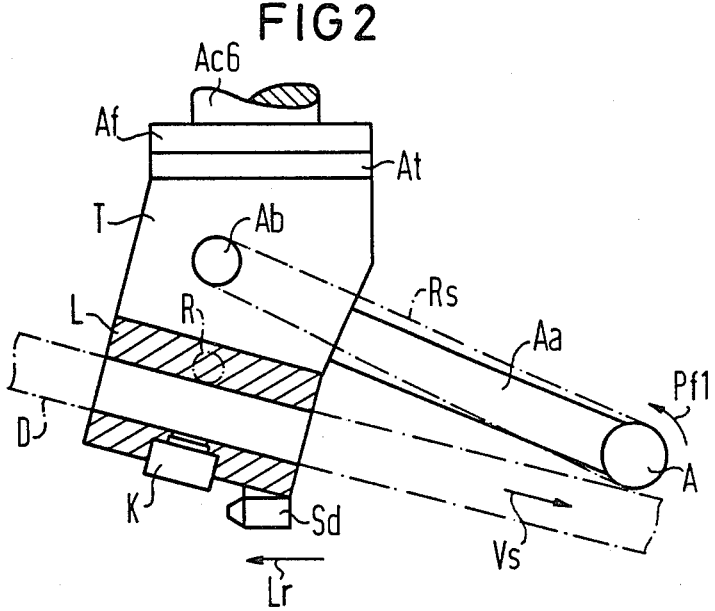

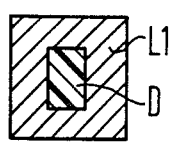
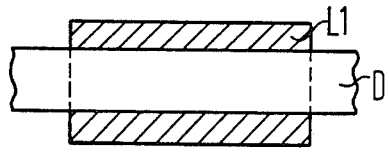
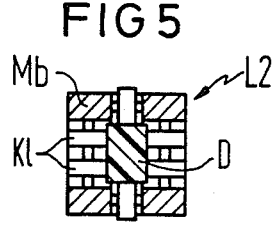
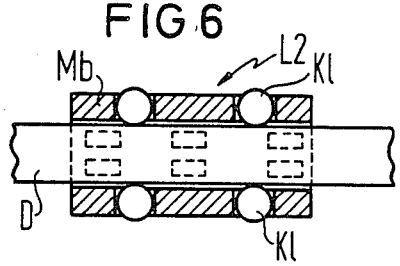
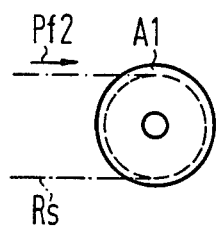
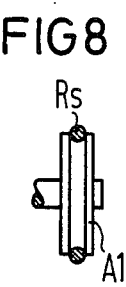
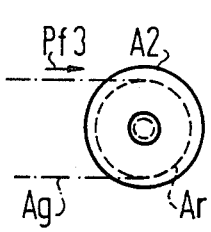
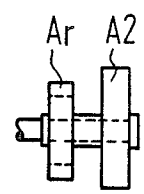
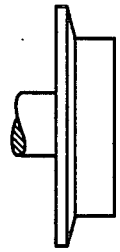
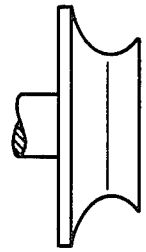
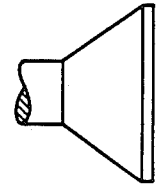

APPARATUS FOR THE INSERTION OF SEALING PROFILES

BACKGROUND OF THE INVENTION

1. Field of the Invention

The invention relates to an apparatus for the insertion of sealing profiles with a programmable manipulation device, particuarly with an industrial robot.

2. Description of the Prior Art

The insertion of sealing profiles into the allocated insertion bead, for example into the receptacle bead of a dishwasher receptacle or into the door bead of a motor vehicle door, has hitherto been resolved such that the person entrusted with this job grasps the sealing profile cut into lengths, presses the start into the insertion bead and then continuously presses the sealing profile in manually with a pressure tool, whereby the sealing profile is led along the insertion bead with the other hand. Attempts to automate the insertion of sealing profiles and undertake it with an industrial robot have hitherto not led to satisfactory results. Given insertion of the sealing profiles with an industrial robot, tensile stresses always occurred, these leading to the fact that the sealing profiles sprang out of the insertion bead in corners and curves.

SUMMARY OF THE INVENTION

An object of the invention is to create an apparatus for the insertion of sealing profiles with a programmable manipulation device, particularly with an industrial robot, which, with low outlay, enables a reliable and durable laying of the sealing profiles even in corner regions and curves of an insertion bead.

This object is achieved in accord with the invention in that, via a longitudinal guide matched to the profile shape, the sealing profile can be directly guided under a pressure roller arranged at a distance therefrom; and in that the pressure roller can be driven such that tensile stresses in the sealing profile are at least largely compensated during laying.

Given the apparatus of the invention, the longitudinal guide assumes the guidance of the sealing profile during laying, whereas the impression into the insertion bead is assumed by the pressure roller. What is thereby of decisive significance is that no, or at most only slight tensile stresses arise in the sealing profile during laying as a result of a corresponding drive of the pressure roller, and thus, a firm hold of the sealing profile is also guaranteed in corners and curves. The longitudinal guide enables, first, a uniform feed of the sealing profile to the pressure roller, and, second, a flexible adaptation to directional changes of the insertion bead. In curve regions, this adaptation is effected by a steeper position of the longitudinal guide, this being required for space reasons in view of the higher outside edge of an insertion bead.

The longitudinal guide can be fashioned as a coulisse which can be manufactured with particularly little outlay. In order to reduce the friction in the longitudinal guide and, thus, for further reduction of the tensile stresses in the sealing profile, the longitudinal guide can also be fashioned as a roller guide.

A feed for the sealing profile acting in the direction toward the pressure roller can also be arranged in the region of the longitudinal guide, whereby this feed is preferably formed by a friction wheel arranged in the longitudinal guide. This measure is suitable for further reducing the tensile stresses particularly given especially elastic sealing profiles.

In accord with a further, preferred development of the invention, the pressure roller is secured to an extension arm rigidly connected to the carrier of the longitudinal guide. A particularly good adaptation to the respective space conditions is enabled with such an extension arm. When the drive motor allocated to the pressure roller is then secured to the carrier, an even higher flexibility of the apparatus derives.

The pressure roller can be directly driven via a round cord belt, whereby such a drive requires particularly low outlay. It is more favorable, however, when the pressure roller can be driven via a drive wheel arranged parallel thereto and via an endless drive member. In particular, the shape of the pressure roller can then be adapted to the profile shape of a sealing profile.

Further, it is also particularly advantageous when a clamp unit for holding the sealing profile is arranged in the longitudinal guide. After being threaded into the longitudinal guide, the sealing profile can then be clamped and retained until the start of the seal is inserted into the insertion bead.

In order to facilitate the impression of the sealing profile, a spray nozzle for charging the insertion region with a lubricant can be arranged below the longitudinal guide.

For further simplification of the overall insertion procedure, a non-driven auxilliary roller for impressing the end of the seal is arranged at a distance from and parallel to the pressure roller. Here, too, it is then expedient when the shape of the auxiliary roller is matched to the profile shape of the sealing profile.

BRIEF DESCRIPTION OF THE DRAWINGS

An exemplary embodiment of the invention is shown in the drawing and shall be set forth in greater detail below.

FIG. 1 illustrates an apparatus for the insertion of sealing profiles in a front view;

FIG. 2 illustrates a side view of the apparatus of FIG. 1 with a cut longitudinal guide.

FIG. 3 illustrates an embodiment of the longitudinal guide formed as a coulisse, shown in cross-section;

FIG. 4 illustrates the embodiment of FIG. 3 in longitudinal section;

FIG. 5 illustrates an embodiment of the longitudinal guide formed as a roller guide, shown in cross-section;

FIG. 6 illustrates the embodiment of FIG. 5 in longitudinal section;

FIG. 7 is a side view of a pressure roller directly driven by a round cord belt;

FIG. 8 is a sectional view of the pressure roller of FIG. 7;

FIG. 9 is a side view of a pressure roller driven via a drive wheel and an endless drive member;

FIG. 10 is a sectional view of the pressure roller of FIG. 9;

FIGS. 11-14 illustrates various shapes of pressure rollers;

DESCRIPTION OF THE PREFERRED EMBODIMENTS

Figure 15:
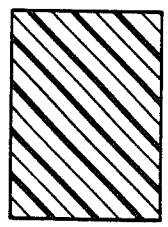
FIGS. 15-18 illustrates various profile shapes of sealing profiles.
Figure 16:
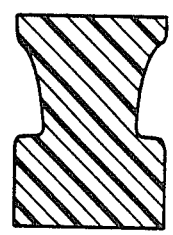
Figure 17:
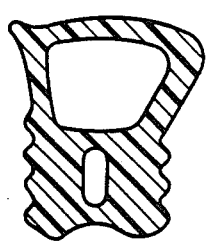
Figure 18:

FIGS. 1 and 2 show a greatly simplified schematic illustration of a device for the insertion of sealing profiles in a front view and a side view. With a flange like connecting part At of an angular carrier T, the apparatus is flanged to a connecting flange Af of a sixth axis Ac 6 of an industrial robot which is otherwise not shown in detail. A longitudinal guide L is laterally secured to that leg of the carrier T proceeding at a right angle relative to the connecting part At, a sealing profile D shown with broken lines being guided in the longitudinal guide L. The longitudinal guide L is directed such that the sealing profile D guided in it is conducted directly under a pressure roller A which is secured to the front end of an extension arm Aa rigidly connected to the carrier T. The pressure roller A is driven in the rotational sense indicated by an arrow Pf1, being driven by a drive motor Am laterally attached to the carrier T, a drive wheel Ab thereof and a round cord belt Rs, whereby the round cord belt Rs is guided in a channel of the pressure roller A proceeding in circumferential direction.

A clamp unit K is arranged in the lower region of the longitudinal guide L, this, for example, being a matter of a short stroke cylinder and the sealing profile D being capable of being clamped in the longitudinal guide L with this. A spray nozzle Sd is likewise secured at the underside of the longitudinal guide L, a lubricant such as, for example, water-soap solution or the like being capable of being sprayed into the laying zone in controlled fashion during laying in order to facilitate the impression of the sealing profile into an insertion bead. A non-driven auxilliary roller Zr which serves the purpose of impressing the end of the seal is arranged at the front end of the extension arm Aa, being arranged at a distance from and parallel to the pressure roller A.

For the purpose of inserting sealing profiles D, the industrial robot, which is a matter of a six axis articulated robot, executes the following work steps:

Fetching the sealing profile D from the readiness position. For this purpose, the industrial robot conducts the apparatus over the free beginning of the sealing profile D and then clamps it in the longitudinal guide L with the clamp unit K. Subsequent thereto, the offering unit releases the sealing profile D.

Transport to the starting point of the insertion bead, impressing the start of the seal into the insertion bead and releasing the clamping in the longitudinal guide L.

Laying the sealing profile D in the insertion bead via the pressure roller A. In order to thereby avoid tensile stresses in the sealing profile D, the pressure roller A is driven in the direction of the arrow Pf1, whereby the sealing profile D is lent a feed Vs opposite the laying direction Lr. When laying especially elastic sealing profiles D an additional feed is provided in the region of the longitudinal guide L, this being indicated in FIG. 2 by a friction wheel R shown dot-dash.

Approximately 10 cm before the end of the insertion bead, the apparatus withdraws and releases the end of the seal. The apparatus is pivoted about 180° whereupon the end of the seal is impressed with the auxilliary roller Zr.

For the purpose of accepting the sealing profile D, the start thereof must be offered such in the offering unit that the beginning is free for about 150 mm in a defined position so that the longitudinal guide can be placed over this beginning. The actual offering can ensue either with seals cut to length which are supplied from a buffer path such as, for example, a chain magazine or can ensue endlessly from a reel.

FIGS. 3 and 4 show an embodiment comprising a longitudinal guide L1 fashioned as a coulisse. This longitudinal guide L1 is formed by a cuboid block of a plastic having good sliding properties in which a passage in accord with the profile contour of the sealing profile D is worked.

FIGS. 5 and 6 show an embodiment comprising a longitudinal guide L2 designed as a roll guide. This longitudinal guide L2 is composed of a metal block Mb comprising a passage in which ball bearings K2 arranged matched to the profile shape of the sealing profile D guide the sealing profile D with especially low friction.

FIGS. 7 and 8 show a pressure roller A1 which is driven in the direction of the arrow Pf2, being driven directly driven via a round cord belt Rs. During impression of a sealing profile D, the pressure is thus at least partially exerted directly via the round cord belt Rs.

FIGS. 9 and 10 show an embodiment wherein a pressure roller A2 is driven via a drive wheel Ar arranged parallel thereto and via an endless drive member Ag, being driven in the direction of the arrow Pf3. The endless drive member Ag is a chain or a toothed belt. Given the embodiments shown in FIGS. 9 and 10, it is additionally possible to optimize the impression event by special shaping of the pressure roller and by adaptation to the profile shape of a sealing profile.

Embodiments of various pressure rollers are shown in FIGS. 11 through 14, whereas FIGS. 15 through 18 show various profile shapes of sealing profiles. For example, the pressure roller shown in FIG. 12 is thus suitable for the profile shape shown in FIG. 15. The pressure rollers shown in FIGS. 13 and 14 can be used with the profile shapes shown in FIG. 18 and FIG. 19. In order to promote the feed of a sealing profile, the circumferential surfaces of the pressure rollers can also be lent the shape of a polygon under given conditions.

Figure 19:
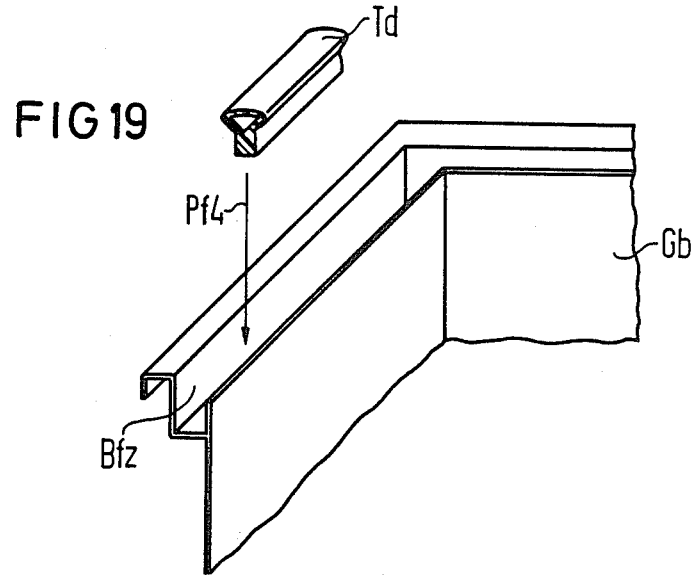
FIG. 19 illustrates the insertion of a door seal in a dish washer receptacle as an example for the employment of the apparatus.

As a use example for the employment of an apparatus of the invention upon employment of an industrial robot, FIG. 19 shows a dishwasher receptacle Gb into whose receptacle bead Bfz a door seal Td is to be inserted in the direction of the arrow Pf4.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. An apparatus for inserting a sealing profile into a groove in a component in a laying direction with a programmable manipulation device, said apparatus comprising:

means for moving said manipulation device in said laying direction;

a pressure roller mounted on said manipulation device, said pressure roller having a circumference;

a longitudinal guide mounted on said manipulation device and terminating a fixed distance from said pressure roller through which said profile is guided as said manipulation device moves in said laying direction, said longitudinal guide being disposed relative to said pressure roller so that upon exiting said longitudinal guide a portion of said profile is between said pressure roller and said component and directly engages a part of said circumference of said pressure roller so that said profile is inserted into said groove by said pressure roller; and means on said manipulation device for substantially avoiding tensile stresses during insertion including drive means and means for connecting said drive means and said pressure roller for rotationally driving said pressure roller in a direction for moving said portion of said profile in engagement with said part of said roller circumference in a direction opposite to said laying direction.

2. An apparatus according to claim 1, wherein said longitudinal guide is fashioned as a coulisse.

3. An apparatus according to claim 1, further comprising roller members in said longitudinal guide engageable with said sealing profile.

4. An apparatus according to claim 1, further comprising means in said manipulation device for feeding said profile from a region adjacent to said longitudinal guide toward said pressure roller.

5. An apparatus according to claim 4, wherein said means for feeding said profile comprises a driven friction wheel mounted in said longitudinal guide.

6. An apparatus according to claim 1, further comprising a carrier on said manipulation device on which said longitudinal guide is mounted and an extension arm rigidly connected to said carrier on which said pressure roller is mounted.

7. An apparatus according to claim 1, further comprising a spray nozzle mounted under said longitudinal guide through which a lubricant is directed toward an insertion region of said sealing profile.

8. An apparatus according to claim 1, further comprising a non-driven auxilliary roller mounted on said maniuplation device at a distance from and parallel to said pressure roller.

9. An apparatus according to claim 6, wherein said drive means is a drive motor secured to said carrier.

10. An apparatus according to claim 9 wherein said drive motor has a drive wheel mounted on said carrier parallel to said pressure roller and wherein said means for connecting is an endless drive member connecting said roller and wheel.

11. An apparatus according to claim 10, wherein the shape of said pressure roller is matched to the profile shape of the sealing profile.

12. An apparatus according to claim 1, further comprising a clamp unit for holding the sealing profile mounted in said longitudinal guide.

13. An apparatus according to claim 7, wherein said pressure roller is directly driven via a round cord belt.

14. An apparatus according to claim 8, wherein the shape of the auxilliary roller is matched to the profile shape of the sealing profile.

* * * * *